US012662380B1

(12) United States Patent
Han et al.

(10) Patent No.: US 12,662,380 B1
(45) Date of Patent: Jun. 23, 2026

(54) PRINTABILITY AND PROFILE CONTROL OF SCREEN-PRINTED GRIDLINES BY RHEOLOGICAL MANIPULATION

(71) Applicant: UNM RAINFOREST INNOVATIONS, Albuquerque, NM (US)

(72) Inventors: Sang M. Han, Albuquerque, NM (US); Brian Rummel, Albuquerque, NM (US); Andre Chavez, Albuquerque, NM (US)

( * ) Notice: Subject to any disclaimer, the term of this patent is extended or adjusted under 35 U.S.C. 154(b) by 861 days.

(21) Appl. No.: 17/931,393

(22) Filed: Sep. 12, 2022

Related U.S. Application Data

(60) Provisional application No. 63/242,891, filed on Sep. 10, 2021.

(51) Int. Cl.
  C01B 32/158 (2017.01)
  B82Y 40/00 (2011.01)
(52) U.S. Cl.
  CPC ............ C01B 32/158 (2017.08); B82Y 40/00 (2013.01); *C01B 2202/02* (2013.01)
(58) Field of Classification Search
  None
  See application file for complete search history.

(56) References Cited

U.S. PATENT DOCUMENTS

| | | | | |
|---|---|---|---|---|
| 8,282,860 | B2 * | 10/2012 | Chung | ................. C09D 11/322 |
| | | | | 556/50 |
| 2005/0121653 | A1 * | 6/2005 | Chacko | .................... H01B 1/22 |
| | | | | 252/500 |
| 2015/0083973 | A1 * | 3/2015 | Khe | ........................ H10K 30/15 |
| | | | | 252/511 |
| 2018/0146545 | A1 * | 5/2018 | Wang | ..................... H05K 1/095 |
| 2018/0312404 | A1 * | 11/2018 | Karagiannidis | ......... C01B 32/19 |
| 2021/0179880 | A1 * | 6/2021 | Swogger | ................. C09D 7/62 |

* cited by examiner

*Primary Examiner* — John J Figueroa
(74) *Attorney, Agent, or Firm* — MH2 Technology Law Group LLP

(57) ABSTRACT

A conductive composition is disclosed. The conductive composition includes a plurality of silver particles and one or more cellulose-based binders. The composition also includes an amount of glass frit, an organic solvent and a plurality of carbon nanotubes, where the conductive composition is formed into a cross-sectional triangular shape, which may include a top cross-sectional dimension and a bottom cross-sectional dimension, where a ratio of the top cross-sectional dimension to the bottom cross-sectional dimension is 0.8 or less. A screen-printed gridline and a method of printing gridlines is also disclosed where the gridlines may be incorporated into a solar cell device.

24 Claims, 7 Drawing Sheets

COMMERCIAL

COMPOSITE

COMMERCIAL

BASELINE

SED   10.0KV   WD 22.2 MM   STD.PC 75.0   HIGHVAC.   x7,500   2 µm
STD   0278   NOV.20 2020

COMPOSITE 3004

SED   10.0KV   WD 22.3 MM   STD.PC 75.0   HIGHVAC.   x7,500   2 µm
STD   0288   NOV.20 2020

600⌐↘

602⌐

| SCREEN-PRINT ONE OR MORE GRIDLINES ONTO A SUBSTRATE |

604⌐

| SINTER THE GRIDLINES AR AN ELEVATED TEMPERATURE |

PRINTABILITY AND PROFILE CONTROL OF SCREEN-PRINTED GRIDLINES BY RHEOLOGICAL MANIPULATION

CROSS REFERENCE TO RELATED APPLICATIONS

This application claims to the benefit of U.S. Provisional Patent Application No. 63/242,891 and filed on Sep. 10, 2021, which is hereby incorporated by reference in its entirety.

STATEMENT OF GOVERNMENT INTEREST

This invention was made with government support under DE-EE0009013 awarded by the Department of Energy. The government has certain rights in the invention.

TECHNICAL FIELD

The present teachings relate generally to engineered materials for use in solar cells and, more particularly, to conductive compositions for use in solar cells.

BACKGROUND

Solar cell cracking, for example, micro-fractures or micro-cracks, are a form of solar cell degradation affecting energy output, system lifetime of solar photovoltaic (PV) systems which can result in millions in financial losses. During daylight, solar panels expand when exposed to direct sunlight and higher temperatures. This thermal expansion, as well as thermal expansion mismatches between materials, brittleness of composites, and imperfections in the solar cell construction can lead to cracking in PV systems.

These and other causes of performance degradation resulting from stress-induced fractures such as environmental conditions, including humidity and freezing, wind exposure, heavy snowfall, and other weather elements, such as rain or hail, can cause micro-cracks. Mechanical stresses from manufacturing, transportation, handling, and installation may lead to micro-cracks and other fatigue-related defects in solar PV systems.

Thus, more robust composite materials that are resistant to micro-cracking and other defects under mechanical stresses and enabling improved solar panel durability are needed. Such crack-tolerant composite materials can lead to improvements in solar cell cracking.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A conductive composition is disclosed. The conductive composition includes a plurality of silver particles and one or more cellulose-based binders. The composition also includes an amount of glass frit. The composition also includes an organic solvent and a plurality of carbon nanotubes, where the conductive composition is formed into a cross-sectional triangular shape, which may include a top cross-sectional dimension and a bottom cross-sectional dimension, where a ratio of the top cross-sectional dimension to the bottom cross-sectional dimension is 0.8 or less.

Implementations of the conductive composition can include where the cross-sectional triangular shape may include a cross-sectional height of from about 15 to about 40 microns. The silver particles are present in an amount of from about 10% to about 99% by a total weight of the conductive composition. The amount of glass frit has a particle size of 5 μm or less. The carbon nanotubes are present in an amount of from about 0.01% to about 20% by a total weight of the conductive composition. The carbon nanotubes may include multi-walled carbon nanotubes having a length of 2 μm or less. The carbon nanotubes may include multi-walled carbon nanotubes having a length of from about 2 μm to about 30 μm. The carbon nanotubes may include single-walled carbon nanotubes having a length of from about 1 μm to about 30 μm. The carbon nanotubes may include a mixture of multi-walled carbon nanotubes and single-walled carbon nanotubes where: the multi-walled carbon nanotubes have a length of 2 μm or less, and the single-walled carbon nanotubes have a length of from about 1 μm to about 30 μm. A ratio of multi-walled carbon nanotubes to single-walled carbon nanotubes is from 1:1 to approximately 9:1. The conductive composition provides an increased fracture toughness by as much as approximately 600%, as compared to a conductive composition without carbon nanotubes. A screen-printed gridline is disclosed including a cross-sectional triangular shape, having a top cross-sectional dimension and a bottom cross-sectional dimension, where a ratio of the top cross-sectional dimension to the bottom cross-sectional dimension is 0.8 or less and the screen-printed gridline includes a conductive composition. A solar cell device, which may include one or more gridlines having the conductive composition is also disclosed.

A screen-printed gridline is also disclosed. The screen-printed gridline includes a cross-sectional triangular shape, which may include a top cross-sectional dimension and a bottom cross-sectional dimension, and a conductive composition, where a ratio of the top cross-sectional dimension to the bottom cross-sectional dimension is 0.8 or less. Implementations of the screen-printed gridline may include a cross-sectional height of the screen-printed gridline of from about 15 μm to about 40 μm. The conductive composition may include silver particles, one or more cellulose-based binders, glass frit, an organic solvent, and carbon nanotubes.

A method of printing gridlines is disclosed, including screen-printing one or more gridlines onto a substrate with a conductive composition that may include silver particles, one or more cellulose-based binders, glass frit, organic solvent, carbon nanotubes, and sintering the gridlines at an elevated temperature.

Implementations of the method of printing gridlines may include where the substrate is incorporated into a solar cell device. A viscosity of the conductive composition prior to sintering can be from about 300,000 cP to about 50,000 cP at a shear rate of from about 10/sec to about 40/sec. The carbon nanotubes are present in an amount of from about 0.01% to about 20% by a total weight of the conductive composition. The carbon nanotubes may include multi-walled carbon nanotubes having a length of from about 2 μm to about 30 μm. The carbon nanotubes may include a mixture of multi-walled carbon nanotubes and single-walled carbon nanotubes where: the multi-walled carbon nanotubes have a length of 2 μm or less, and the single-walled carbon nanotubes have a length of from about 1 μm to about 30 μm. A ratio of multi-walled carbon nanotubes to single-walled carbon nanotubes is from 1:1 to approximately 9:1. A height of the one or more gridlines is from about 15 μm to about 40 μm. The one or more gridlines may include a cross-sectional triangular shape, which may include a top cross-sectional dimension and a bottom cross-sectional dimension where a ratio of the top cross-sectional dimension to the bottom cross-sectional dimension is 0.8 or less.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1A:
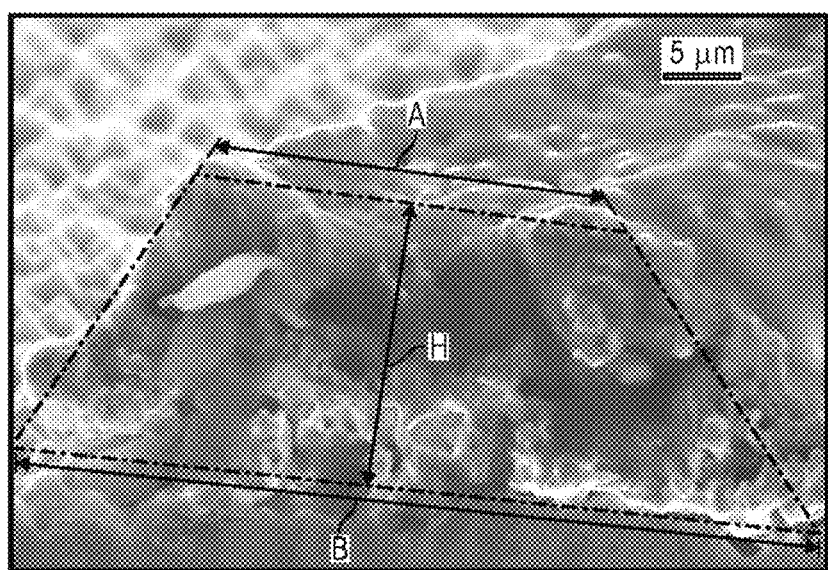
FIGS. 1A and 1B are photographs depicting photomicrographs of a commercially available conductive material formulation and a composite material formulation incorporated with carbon nanotubes, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Conductive trace material cracking in, for example, solar cells and in solar cell cracking resulting in micro-fractures or micro-cracks, negatively impact energy output, system lifetime of solar photovoltaic (PV) systems or other component devices including conductive traces. Thermal expansion of devices or thermal expansion mismatches between materials, brittleness of composites, and imperfections in the solar cell construction and other device construction can lead to cracking in PV systems and other electrochemical devices. These and other causes of performance degradation resulting from stress-induced fractures such as environmental conditions, including humidity and freezing, wind exposure, heavy snowfall, and other weather elements, such as rain or hail, can cause micro-cracks. Mechanical stresses from manufacturing, transportation, handling, and installation may lead to micro-cracks and other fatigue-related defects in electrochemical devices. More robust conductive composite materials according to the present disclosure provide compositions to address these and other disparities in presently available composite materials. The present disclosure provides conductive compositions including silver particles, one or more cellulose-based binders, glass frit, organic solvents, and carbon nanotubes, including single walled and multiwalled carbon nanotubes. Conductive compositions of the present disclosure include the formation of traces or gridlines where the conductive composition is formed into a cross-sectional triangular shape. A cross-sectional triangular shape can include a cross-sectional shape that is triangular in shape, but not necessarily strictly so. The cross-sectional triangular shape can include a top cross-sectional dimension and a bottom cross-sectional dimension, wherein a ratio of the top cross-sectional dimension to the bottom cross-sectional dimension is 0.8 or less. The cross-sectional triangular shape, in certain examples, can include a cross-sectional height of from about 15 to about 40 microns. Silver particles can be present in the conductive composition in an amount of from about 10% to about 99% by a total weight of the conductive composition. Certain examples include silver particles having a single particle size distribution having a size above 1 micron or a bimodal particle size distribution centered around 0.4 μm and 1.2 μm. Such a bimodal particle size distribution can provide a maximized packing particle arrangement within a composite formulation. The conductive particles can include other metals or carbon-based materials, or combinations thereof. Other conductive fillers may include copper and aluminum particles. The conductive composition, in examples, can also include where the glass frit has a particle size of 5 μm or less. The carbon nanotubes can be present in an amount of from about 0.01% to about 20% by a total weight of the conductive composition, or from about 1.0% to about 10%, or from about 1.0% to about 5.0% of a total weight of the conductive composition. In certain examples, the carbon nanotubes are multi-walled carbon nanotubes (MW-CNTs) having a length of 2 μm or less, or in other examples, having a length of from about 2 μm to about 30 μm. The diameter of the MW-CNTs can range from 5 to 20 nm in exemplary examples. In still other examples, the carbon nanotubes are single-walled carbon nanotubes (SW-CNTs) having a length of from about 1 μm to about 30 μm. The diameter of the SW-CNTs can range from 1 to 5 nm in exemplary examples. In certain examples of the conductive composition, the carbon nanotubes include a mixture of multi-walled and single-walled carbon nanotubes where a ratio of multi-walled carbon nanotubes to single-walled carbon nanotubes is from 1:1 to approximately 9:1. In still other examples, the conductive composition provides a composite material having an increased fracture toughness by as much as approximately 600%, as compared to a conductive composition without carbon nanotubes in the composition. The conductive composition, prior to being sintered or cured, has a viscosity of from about 300,000 cP to about 50,000 cP, where the shear rate is from about 10/sec to about 40/sec.

Conductive compositions as described herein can be used in the fabrication, by screen-printing or other deposition methods, of gridlines to form conductive traces or grids in solar cell, PV cell, or other electrochemical and electronic devices. The deposited gridlines can be printed onto a substrate, such as a mono-crystalline silicon substrate, silicon nitride, or silicon substrates having a silicon nitride coating as well. The deposited gridlines can also be printed on transparent conducting oxide films and substrates, such as indium tin oxide and its halogenated forms.

Figure 1B:
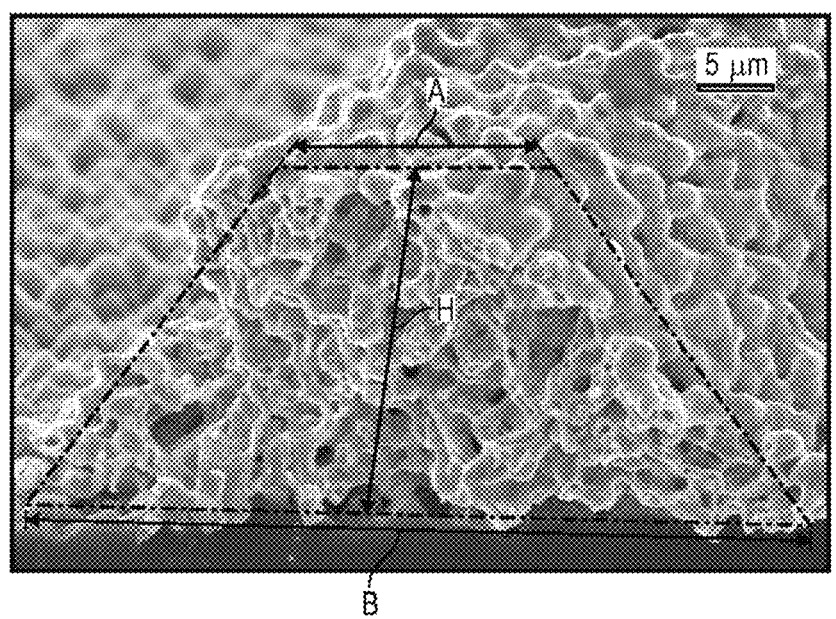
Figure 2A:
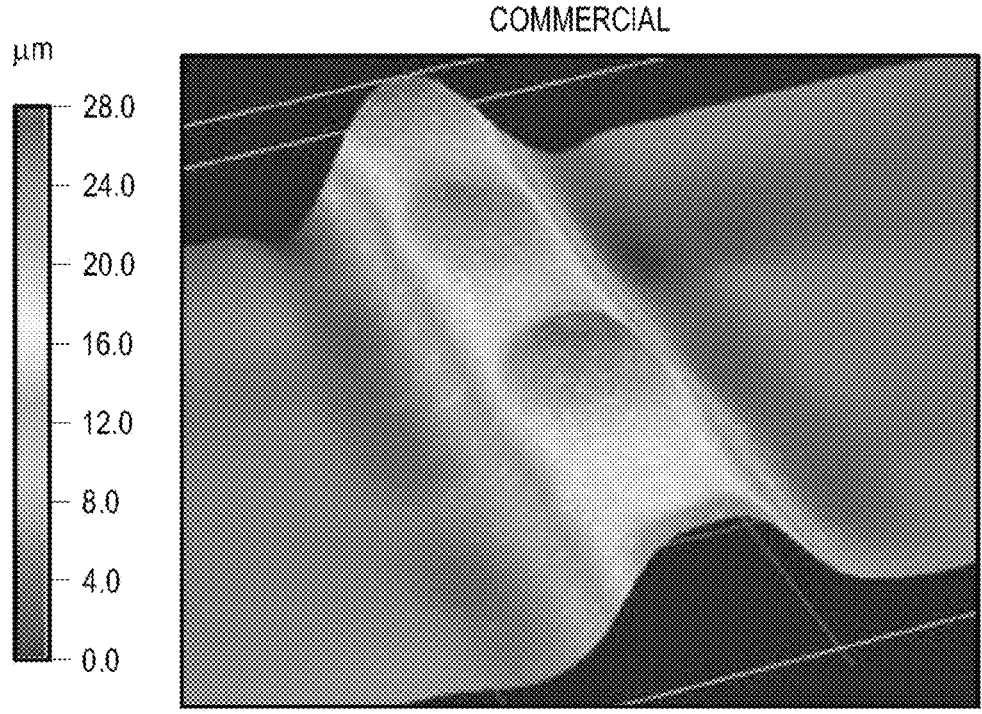
FIGS. 2A-2D depict three-dimensional profile measurements along with profilometer measurements of gridlines screen-printed and fired from commercial paste versus a composite paste, in accordance with the present disclosure.
Figure 2B:
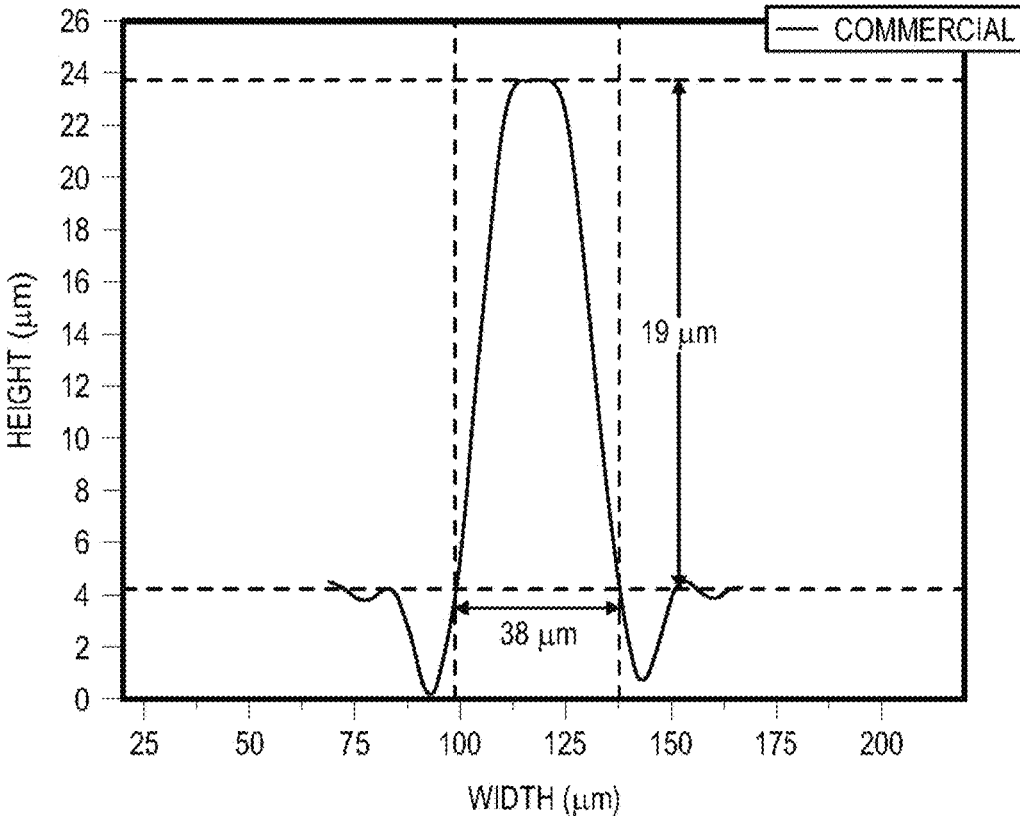
Figure 2C:
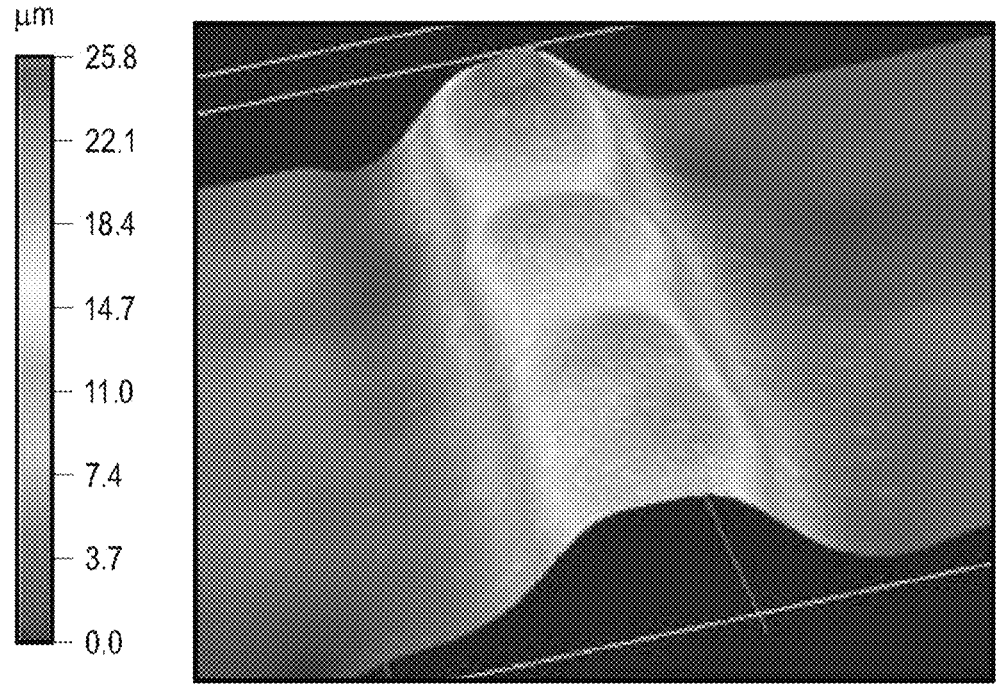
Figure 2D:
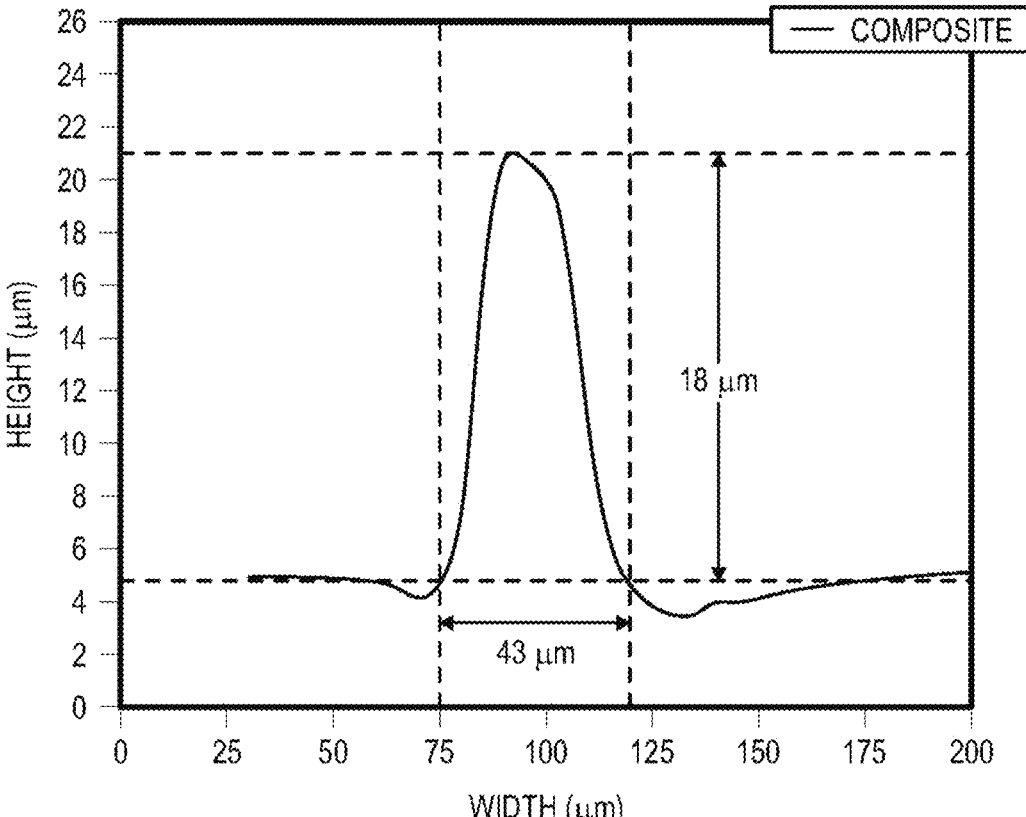

FIGS. 1A and 1B are photographs depicting photomicrographs of a commercially available conductive material formulation and a composite material formulation incorporated with carbon nanotubes, in accordance with the present disclosure. As shown, the incorporation of carbon nanotubes (CNT) into a commercial silver paste (i.e., composite silver paste formulation according to the present disclosure) alters rheological shear-thinning response of the composite paste, resulting in a triangular cross-sectional profile (FIG. 1B), as compared to the more trapezoidal cross-sectional profile of gridlines screen-printed from commercial silver paste (FIG. 1A). As indicated in both FIGS. 1A and 1B, a top cross-sectional dimension (a) is indicated, as is a bottom cross-sectional dimension (b), and a cross-sectional height (h) of the gridlines. As described herein, a more triangular cross-sectional shape includes where a ratio of the top cross-sectional dimension to the bottom cross-sectional dimension is 0.8 or less. In other examples, a ratio of the top cross-sectional dimension to the bottom cross-sectional dimension 25 influences the light capture of a PV cell. Certain examples include where ratio of the top cross-sectional dimension to the bottom cross-sectional dimension is 0.7 or less, or 0.5 or less. This enhanced shaped control is further driven by the rheological characteristics provided by incorporation of CNT into the conductive composition. In other examples, the ratio of the top cross-sectional dimension to the bottom cross-sectional dimension can be 0.2 or less, almost approaching the true triangular shape with an apex, as the top cross-sectional dimension asymptotically approaches zero.

FIGS. 2A-2D depict three-dimensional profile measurements along with profilometer measurements of gridlines screen-printed and fired from commercial paste versus a composite paste, in accordance with the present disclosure. The comparison of FIGS. 2A and 2B, commercial composite material, as compared to the data shown in FIGS. 2C and 2D, the composite material of the present disclosure, demonstrate the rheological impact of carbon nanotubes (CNT) addition to the conductive composite formulation, in accordance with the present disclosure. The gridlines as shown, have a nominal gridline height of 20 µm to 40 µm. The height can also range from 10 µm to 80 µm, or a nominal gridline width of from about 20 µm to about 40 µm. The gridline widths can also range from 10 µm to 80 µm. The recent trends in mono-crystalline silicon PV cell manufacturing is to make the gridline width as narrow as possible to minimize the silver usage, in some cases reaching below 20 µm.

As described herein, a tall triangular cross-sectional shape is more suitable for capturing higher amounts of sunlight and subsequently reflecting higher amounts of sunlight captured on the metal surface at an angle towards the substrate. In certain examples, the angle of the top cross-sectional dimension and a sidewall of the triangular cross-sectional shape can enhance the efficiency of sunlight captured by the gridline as well. If one would define the wall angle as the angle between the gridline sidewall and the horizontal substrate surface, the wall angle would range from 90 to 120 degrees. The angle could also range from 90 to 150 degrees. Given a constant cross-sectional height, a ratio of the top cross-sectional dimension of a gridline to a bottom cross-sectional dimension can influence sunlight capture and therefore efficiency of a photovoltaic cell operation. The top flat surface of the metal gridlines reflects the impinging sunlight away from the substrate and does not channel the light to the substrate. In contrast, the sunlight impinging on the gridline sidewall would reflect from the gridline metal surface and can be channeled towards the silicon substrate. The sidewall angle and the distribution of incident angle of sunlight would determine how much of the reflected light would be channeled towards the substrate. One could use the ray tracing technique to determine how much of the incident sunlight would be channeled towards the substrate.

Figure 3:
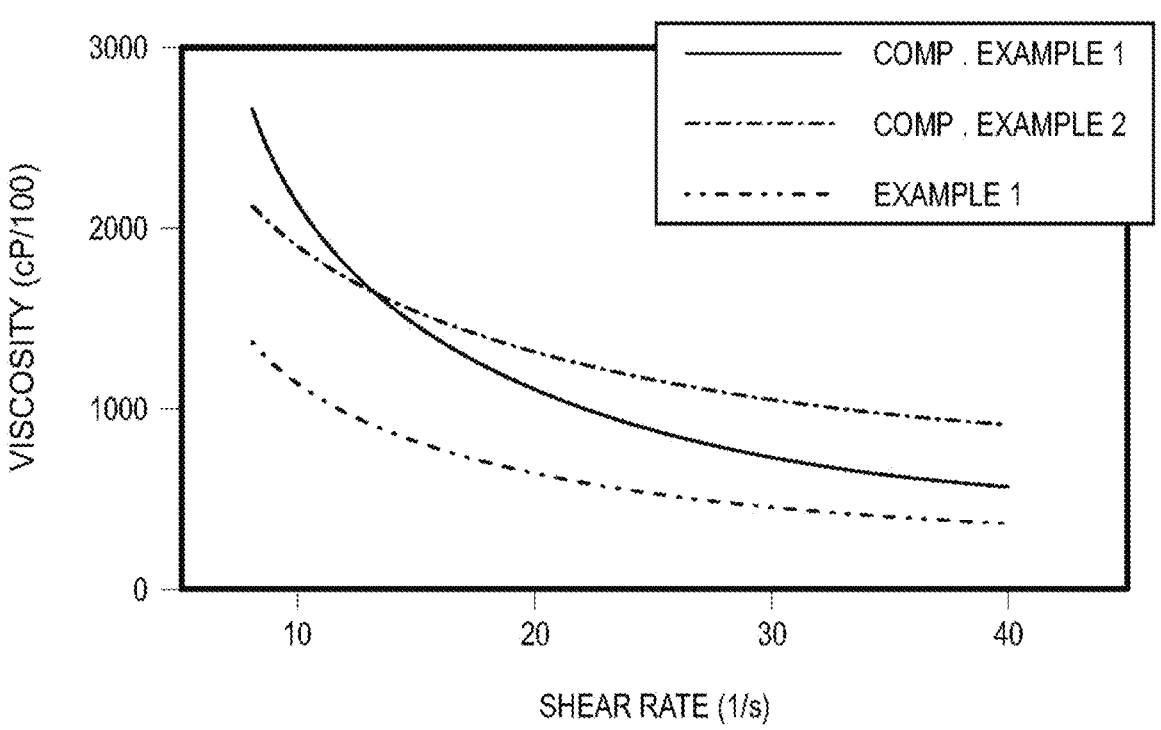
FIG. 3 is a graph illustrating viscosity as a function of shear rate for several conductive composite material formulations, in accordance with the present disclosure.

FIG. 3 is a graph illustrating viscosity as a function of shear rate for several conductive composite material formulations, in accordance with the present disclosure. The graph displays the rheological behavior of Example 1 as compared to Comparative Example 1 and Comparative Example 2. While all curves on the graph in FIG. 3 exhibit shear-thinning behavior, the data associated with Example 1 has a lower viscosity throughout the shear rates evaluated. Without being bound by any particular theory, it is believed that the addition of carbon nanotubes into the formulation of Example 1 improves the rheological behavior of the conductive composition when used to produce gridlines as described herein. Table 1 below includes an ingredient list and components in Comparative Example 1 and Comparative Example 2 as compared to Example 1.

TABLE 1

| Formulation ingredients for Comparative Example 1 and Comparative Example 2 | | |
|---|---|---|
| Formulation Ingredients | Comparative Example 1 (D2) Weight (g) | Comparative Example 2 (E1) Weight % |
| Total Solvent | 6.691 | 11.42 |
| Ether Acetate | 6.691 | 11.42 |
| Butyl Ether | 0 | 0.00 |
| Glycol Ether | 0 | 0.00 |
| Ethyl Cellulose 1 | | |
| Ethyl Cellulose 2 | 0.468 | 0.80 |
| Glass Frit | 1.424 | 2.43 |
| Silver | 50.005 | 85.35 |
| CNT | 0 | 0.00 |
| Sample Total | 58.59 | 100.00 |

Example 1, not included in the table, includes one or more CNT fillers, single walled or multiwalled, into a formulation to provide an improved formulation having improved control of the rheological and conductivity properties of the conductive paste. The triangular profile as defined and described herein is provided and enhanced by the rheological manipulation of addition of CNT to conductive paste. For colloidal solutions, such as silver and CNT particles suspended in a mixture of solvent and polymer binder, their non-Newtonian behavior of viscosity is a strong function of the shear rate. As shear rate increases, the viscosity initially decreases, then the viscosity can recover and come back up with further increases in shear rate. As screen printing is a shear inducing methodology, the addition of CNTs has an impact on the rheological properties of the composite such that it provides the triangular profile. It should be noted that the addition of reduced particle size glass frit in Comparative Example 2, as compared to Comparative Example 1, results in less alteration of rheological properties. Furthermore, having smaller particle sized glass frit decreases the firing temperature (heat load) of the conductive composition. Comparative Examples 1 and 2, D2 and E1, are formulated silver pastes without carbon nanotube loadings. Mortar-and-pestled glass frit in Comparative Example 1 (D2) has a larger diameter >10 μm, compared to ball-milled glass frit of Comparative Example 2 (E1) whose diameter is less than 1 μm. The paste with smaller glass frit of Comparative Example 1 (E1) approaches similar properties as the commercially available silver paste, as shown in Table 2. Additional factors such as snap-off speed and other parameters of the screen-printing process may impact line shape as well. The addition of CNTs clearly has an impact on non-Newtonian behavior (i.e., shear-thinning at low shear rate as well as shear-thickening at high shear rate) of the composite rheology, subsequently impacting the printed cross-sectional shape of the gridlines and busbars. The goal is to manipulate the composite rheology in such as a way to print gridlines with a triangular shape that would maximize the sunlight capture.

Figure 4:
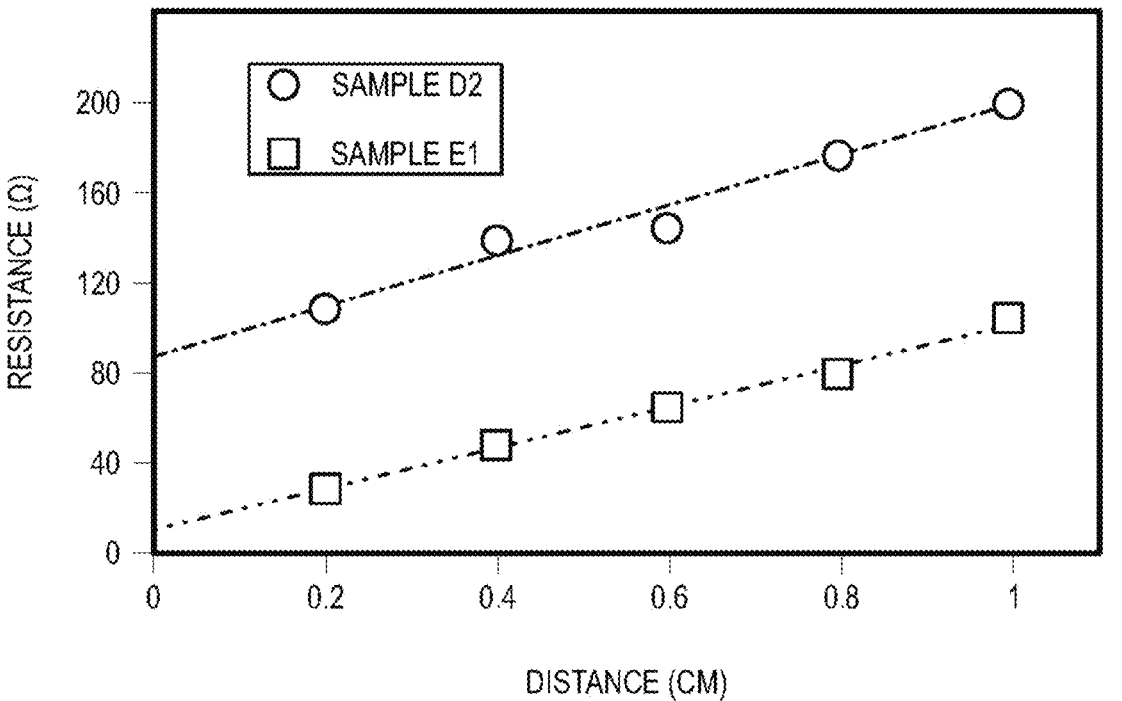
FIG. 4 is a graph illustrating resistance (52) as a function of distance (cm) for transmission line measurements (TLM) of gridlines screen-printed and fired of several conductive composite material formulations, in accordance with the present disclosure.

FIG. 4 is a graph illustrating resistance (Ω) as a function of distance (cm) for transmission line measurements (TLM) of gridlines screen-printed and fired of several conductive composite material formulations, in accordance with the present disclosure. Resistance data of gridlines screen-printed and fired from Comparative Example 1 (D2), Comparative Example 2 (E1) are shown in FIG. 4. Table 2 includes contact resistance (Rc) and emitter sheet resistance (Rsh) for the gridlines screen-printed and fired from Comparative Example 1 (D2), Comparative Example 2 (E1), and a commercial reference silver paste.

TABLE 2

| Sample | Rc (W-cm2) | Rsh (W-cm2) |
| --- | --- | --- |
| Comparative Example 1 (D2) | 2.98 | 1.21 |
| Comparative Example 2 (E1) | 0.69 | 1.26 |
| Commercial Reference | ~0.35 | 0.17 |

The performance of the glass frit is greatly improved when using the ball mill. Contact resistance of in-house paste is comparable to a commercial paste reference according to Transmission Line Measurement (TLM) results.

In conductive pastes that are commercially available, the commercially available silver pastes can include silver particles greater than 10 microns in diameter with bimodal particle size distribution, cellulose-based binder, glass frit which contains lead oxide, and organic solvent. The lead oxide from the glass frit can react with silicon nitride anti-reflection coatings and open up windows in the nitride layer, through which silver makes ohmic contact with the emitter. In some examples, the silver can spike through the emitter of the p-n junction and cause shunting. Fine gridline screen printing, followed by a belt furnace sintering process to fire the paste at an elevated temperature, can be used for low-cost module manufacturing rather than standard lithographic methods normally seen in CMOS processing of PV modules. The addition of CNT to such formulations, while processing under similar firing conditions, or temperature profiles over time, can serve to enhance the level of sintering as well as the conductivity.

FIGS. 5A-5D are a set of images from a scanning electron microscope (SEM) comparing the impact of sintering for several conductive composite material formulations, in accordance with the present disclosure. The images in FIGS.

5A-5D further exhibit the impact of carbon nanotubes on silver particle sintering and physical interaction within conductive composite materials as described herein. Incorporation of CNTs with different physical characteristics, for example, CNTs of different lengths, diameters, single walled, multiwalled, or combinations thereof, shows different levels of enhanced silver particle sintering. Each of the four composite materials depicted in FIGS. 5A-5D were prepared according to similar processing conditions.

Figure 5A:
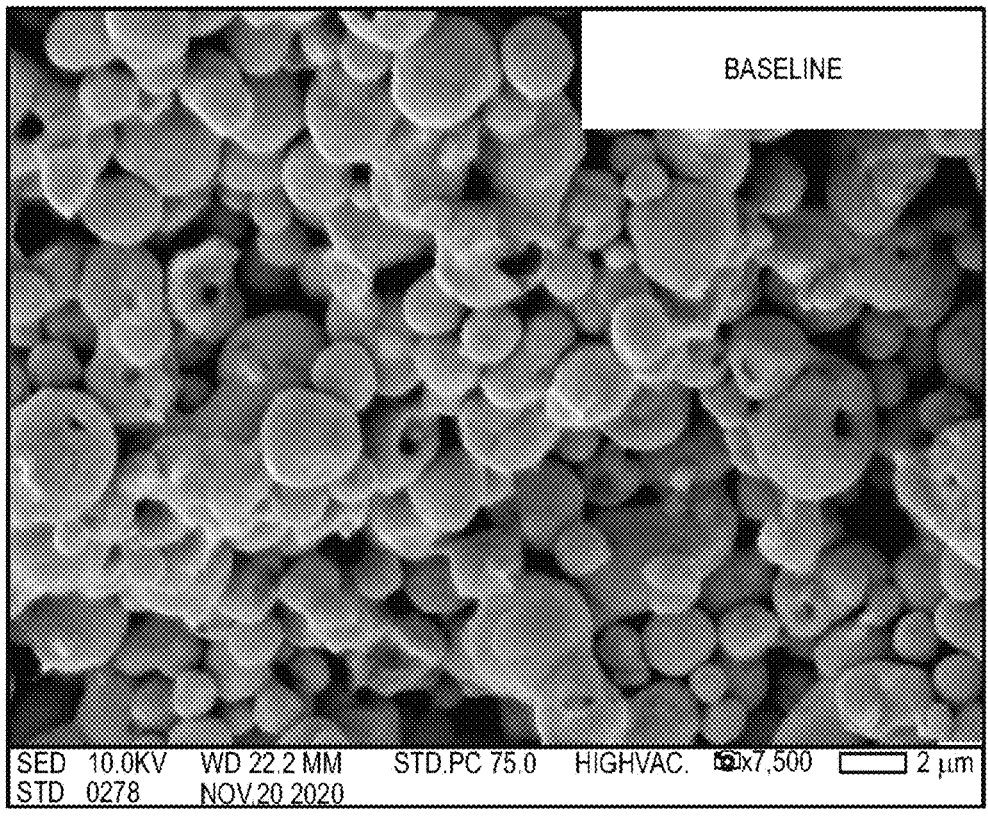
FIGS. 5A-5D are a set of images from a scanning electron microscope (SEM) comparing the impact of sintering for several conductive composite material formulations, in accordance with the present disclosure.
Figure 5B:
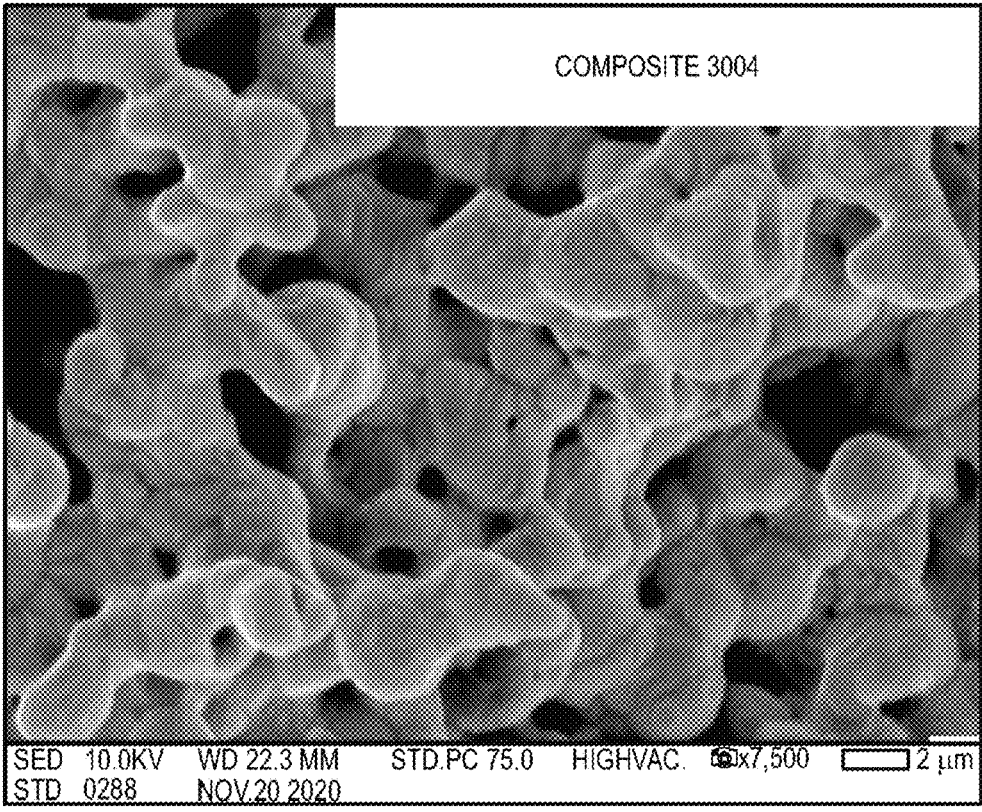
Figure 5C:
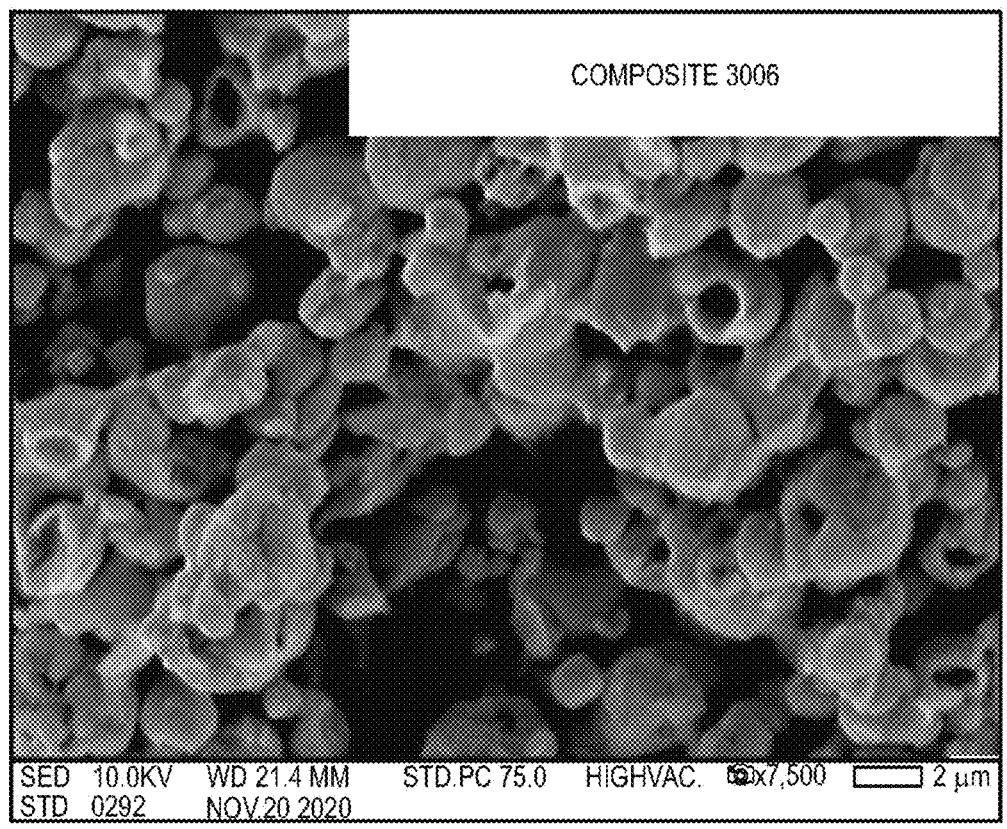
Figure 5D:
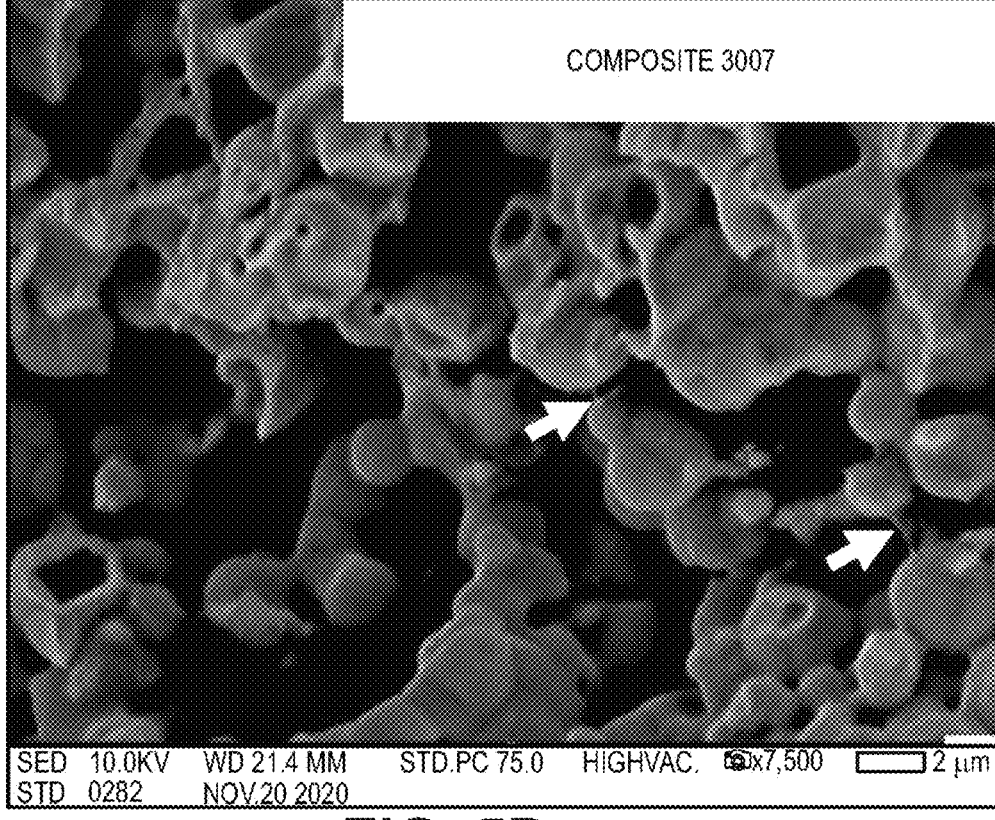

The baseline formulation shown in FIG. 5A is a commercially sourced reference paste. All samples are treated with the same printing and firing process with fast cooling. After firing, as the gridlines are fractured, the fractured surface is observed by the scanning electron microscope images in FIGS. 5A-5D. The formulation shown in FIG. 5A shows intergranular fracture patterns. The composite paste (3004) of FIG. 5B exhibits more of a network of connected silver particles, with some void volume. The bottom two composite pastes shown in FIG. 5C (3006) and FIG. 5D (3007) show "sheared-off" fracture patterns, which indicate increased ductility within the composite formulation structure. Composite paste 3004, FIG. 5B, is loaded with short multi-walled carbon nanotubes (5-20 nm in diameter and ~0.5-5 μm in length). Composite paste 3006, FIG. 5C, includes long multi-walled carbon nanotubes (5 to 20 nm in diameter and 2 to 20 μm in length). Composite paste 3007, FIG. 5D, includes a mixture of long single-walled carbon nanotubes (1 to 5 nm in diameter and 10 to 30 μm in length), and short multi-walled carbon nanotubes (5-20 nm in diameter and ~0.5-5 μm in length) in a 1:9 ratio by weight.

As demonstrated herein, the cross-sectional SEMs, as indicated by several arrows, the CNT surrounds some of the silver particles, and the CNT particles merge and coordinate around the silver spherical particles. The presence of CNT in the conductive composite materials enhances and promotes the sintering processes, resulting in a similar level of sintering at a lower processing temperature. Once the CNTs are added to the paste, we expect a range from 10 to 50 degree Celsius depression in sintering temperature to achieve the same level of sintering. This enhanced level of sintering provides an increased interparticle contact within the composite matrix, which improves conductivity and physical properties of the resulting gridlines.

Adding carbon nanotubes into the composite paste provides several benefits. The printed cross-sectional profile of composite material is more triangular, which is advantageous in terms of light collection. The cross-sectional triangular shape gridline profile harnesses more photons than the typical trapezoidal cross-sectional profile of gridlines screen-printed and fired from commercially available pastes. Both commercial paste and composite pastes display shear thinning properties, where the viscosity decreases with increasing shear rate. However, controlling the shear-thinning behavior and absolute level of shear thinning helps control screen printability and printed profile shape, as shown in FIGS. 1A and 1B. Furthermore, following the screen snap-off, the printed gridlines no longer experience shear, the viscosity increases, and the gridlines maintain the printed profile. This thixotropic property is important to maintain the initially printed gridline profile.

In certain examples, upon tensile test (i.e., stress vs. strain curve) of conductive compositions provided herein, the gridlines screen-printed and fired from a composite paste, incorporated with short, 5-20 nm in diameter and ~0.5-5 μm in length, multi-walled carbon nanotubes (MW-CNTs), maintain the same elastic modulus as the gridlines screen-printed and fired from a reference commercial paste. However, the composite paste including CNTs can increase the fracture toughness by as much as ~600%, as compared to the commercial paste. In still other examples, gridlines screen-printed and fired from a composite paste, incorporated with long, 1 to 5 nm in diameter and 10 to 30 μm in length, single-walled carbon nanotubes (SW-CNTs), or a mixture of long SW-CNTs and short MW-CNTs, show a reduced elastic modulus than the gridlines screen-printed and fired from a commercial paste. However, the composite paste increases the ductility and the fracture toughness by as much as ~600% by increasing the critical strain at which the gridlines fracture. The incorporation of CNTs into conductive composite paste materials can exhibit enhanced silver particle sintering, increased fracture toughness by greater than a factor of 6, electrical gap-bridging up to 65 μm with self-healing settling at approximately 25 μm. Additionally, conductive composite paste materials of the present disclosure can exhibit three-point-bending test results also showing enhanced electrical gap bridging over the cell cracks.

Figure 6:
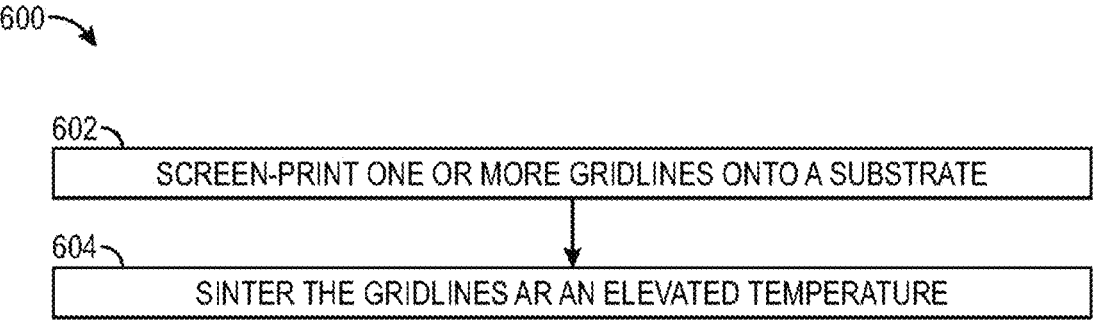
FIG. 6 is a flowchart illustrating a method of printing gridlines, in accordance with the present disclosure.

FIG. 6 is a flowchart illustrating a method of printing gridlines, in accordance with the present disclosure. A method of printing gridlines 600 includes a step of screen-printing one or more gridlines onto a substrate 602 using a conductive composition comprising silver particles, one or more cellulose-based binders, glass frit, organic solvent, and carbon nanotubes. Next, the gridlines are sintered at an elevated temperature 604. In certain examples, the substrate is incorporated into a solar cell device. In alternate examples, the viscosity of the conductive composition prior to sintering is from about 300,000 cP to about 50,000 cP at a shear rate of from about 10/sec to about 40/sec. the conductive composition can include carbon nanotubes present in an amount of from about 0.01% to about 20% by a total weight of the conductive composition. The carbon nanotubes can include multi-walled carbon nanotubes having a length of from about 2 microns to about 30 microns. Certain examples can include where the carbon nanotubes comprise a mixture of multi-walled and single-walled carbon nanotubes where the multi-walled carbon nanotubes have a length of 2 micron or less, and the single-walled carbon nanotubes have a length of from about 1 μm to about 30 μm. In some examples, the conductive composition includes where a ratio of multi-walled carbon nanotubes to single-walled carbon nanotubes is from 1:1 to approximately 9:1. The method of printing gridlines 600 includes where a height of the one or more gridlines is from about 15 to about 40 microns. The method of printing gridlines 600 produces gridlines having a cross-sectional triangular shape with a top cross-sectional dimension and a bottom cross-sectional dimension, where a ratio of the top cross-sectional dimension to the bottom cross-sectional dimension is 0.8 or less.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including." "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple." "coupled." "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A conductive composition, comprising:
a plurality of silver particles;
one or more cellulose-based binders;
an amount of glass frit;
an organic solvent; and
a plurality of carbon nanotubes; and wherein:
    a viscosity of the conductive composition is from about 300,000 cP to about 50,000 cP at a shear rate of from about 10/sec to about 40/sec.

2. The conductive composition of claim 1, wherein the cross-sectional triangular shape comprises a cross-sectional height of from about 15 μm to about 40 μm.

3. The conductive composition of claim 1, wherein the silver particles are present in an amount of from about 10% to about 99% by a total weight of the conductive composition.

4. The conductive composition of claim 1, wherein the amount of glass frit has a particle size of 5 μm or less.

5. The conductive composition of claim 1, wherein the carbon nanotubes are present in an amount of from about 0.01% to about 20% by a total weight of the conductive composition.

6. The conductive composition of claim 1, wherein the carbon nanotubes comprise multi-walled carbon nanotubes having a length of 2 μm or less.

7. The conductive composition of claim 1, wherein the carbon nanotubes comprise multi-walled carbon nanotubes having a length of from about 2 μm to about 30 μm.

8. The conductive composition of claim 1, wherein the carbon nanotubes comprise single-walled carbon nanotubes having a length of from about 1 μm to about 30 μm.

9. The conductive composition of claim 1, wherein the carbon nanotubes comprise a mixture of multi-walled carbon nanotubes and single-walled carbon nanotubes wherein:

the multi-walled carbon nanotubes have a length of 2 μm or less; and the single-walled carbon nanotubes have a length of from about 1 μm to about 30 μm.

10. The conductive composition of claim 9, wherein a ratio of multi-walled carbon nanotubes to single-walled carbon nanotubes is from 1:1 to approximately 9:1.

11. The conductive composition of claim 1, having an increased fracture toughness by as much as approximately 600%, as compared to a conductive composition without carbon nanotubes.

12. A screen-printed gridline, comprising:
a cross-sectional triangular shape, comprising:
a top cross-sectional dimension;
a bottom cross-sectional dimension; and wherein:
a ratio of the top cross-sectional dimension to the bottom cross-sectional dimension is 0.8 or less; and
the conductive composition of claim 1.

13. A solar cell device, comprising one or more gridlines having the conductive composition of claim 1.

14. A screen-printed gridline, comprising:
a cross-sectional triangular shape, comprising:
a top cross-sectional dimension; and
a bottom cross-sectional dimension; and
a conductive composition; and wherein:
a ratio of the top cross-sectional dimension to the bottom cross-sectional dimension is 0.8 or less; and
the conductive composition comprises:
silver particles;
one or more cellulose-based binders;
glass frit;
an organic solvent; and
carbon nanotubes.

15. The screen-printed gridline of claim 14, further comprising a cross-sectional height of the screen-printed gridline of from about 15 μm to about 40 μm.

16. A method of printing gridlines, comprising:
screen-printing one or more gridlines onto a substrate with a conductive composition comprising silver particles, one or more cellulose-based binders, glass frit, organic solvent, carbon nanotubes; and
sintering the gridlines at an elevated temperature.

17. The method of claim 16, wherein the substrate is incorporated into a solar cell device.

18. The method of claim 16, wherein a viscosity of the conductive composition prior to sintering is from about 300,000 cP to about 50,000 cP at a shear rate of from about 10/sec to about 40/sec.

19. The method of claim 16, wherein the carbon nanotubes are present in an amount of from about 0.01% to about 20% by a total weight of the conductive composition.

20. The method of claim 16, wherein the carbon nanotubes comprise multi-walled carbon nanotubes having a length of from about 2 μm to about 30 μm.

21. The method of claim 16, wherein the carbon nanotubes comprise a mixture of multi-walled carbon nanotubes and single-walled carbon nanotubes wherein:
the multi-walled carbon nanotubes have a length of 2 micron or less; and
the single-walled carbon nanotubes have a length of from about 1 μm to about 30 μm.

22. The method of claim 21, wherein a ratio of multi-walled carbon nanotubes to single-walled carbon nanotubes is from 1:1 to approximately 9:1.

23. The method of claim 21, wherein a height of the one or more gridlines is from about 15 to about 40 μm.

24. The method of claim 16, wherein the one or more gridlines comprises:
a cross-sectional triangular shape, comprising:
a top cross-sectional dimension; and
a bottom cross-sectional dimension; and
a ratio of the top cross-sectional dimension to the bottom cross-sectional dimension is 0.8 or less.

* * * * *